United States Patent
Ramaiah et al.

(10) Patent No.: US 12,340,210 B2
(45) Date of Patent: Jun. 24, 2025

(54) SYSTEMS AND METHODS FOR MULTI-CHANNEL REBOOTLESS FIRMWARE UPDATES

(71) Applicant: Dell Products, L.P., Round Rock, TX (US)

(72) Inventors: Mahesh Babu Ramaiah, Bangalore (IN); Rama Rao Bisa, Bangalore (IN); Manjunath Am, Bangalore (IN); Manjunath Vishwanath, Bangalore (IN); Pavan Kumar Gavvala, Bangalore (IN); Balamurugan Gnanasambandam, Bengaluru (IN); Naveen Karthick Chandrasekaran, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 235 days.

(21) Appl. No.: 17/935,197

(22) Filed: Sep. 26, 2022

(65) Prior Publication Data
US 2024/0103847 A1    Mar. 28, 2024

(51) Int. Cl.
*G06F 8/656* (2018.01)
*G06F 8/65* (2018.01)
*G06F 8/654* (2018.01)

(52) U.S. Cl.
CPC .................... *G06F 8/656* (2018.02)

(58) Field of Classification Search
CPC ............. G06F 8/65; G06F 8/656; G06F 8/654
See application file for complete search history.

(56) References Cited

U.S. PATENT DOCUMENTS

| | | | |
|---|---|---|---|
| 9,158,526 B1 * | 10/2015 | Nguyen | H04W 4/50 |
| 9,866,601 B2 * | 1/2018 | Hinohara | H04N 21/4586 |
| 11,388,727 B1 * | 7/2022 | Argenti | H04W 40/02 |
| 2014/0270557 A1 * | 9/2014 | Ignatchenko | G06T 9/00 382/239 |
| 2018/0203779 A1 * | 7/2018 | Huang | G06F 11/3048 |
| 2021/0011735 A1 * | 1/2021 | Edwards, III | G06F 9/445 |
| 2021/0314744 A1 * | 10/2021 | Files | H04W 4/026 |
| 2022/0063556 A1 * | 3/2022 | Neubauer | G06F 21/88 |

* cited by examiner

*Primary Examiner* — Noor Alkhateeb
(74) *Attorney, Agent, or Firm* — Fogarty LLP

(57) ABSTRACT

Systems and methods provide multi-channel transmission of a firmware image to a hardware component of an IHS (Information Handling System), where the firmware image is transmitted by a remote access controller of the IHS that supports remote management of the IHS. Upon a firmware being initiated, the remote access controller determines an available bandwidth of a first signaling pathway of the hardware component and also determines an available bandwidth of a second signaling pathway of the hardware component. One portion of the firmware image is transmitted to the hardware component using the first signaling pathway, where a size of that portion is selected based on the available bandwidth of the first signaling pathway. Another portion of the firmware image is transmitted to the hardware component using the second signaling pathway, where a size of that portion is selected based on the available bandwidth of the second signaling pathway.

14 Claims, 4 Drawing Sheets

SYSTEMS AND METHODS FOR MULTI-CHANNEL REBOOTLESS FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more buses that connect to a plurality of hardware components; a first of the hardware components of the IHS; and the remote access controller supporting remote management of the plurality of managed hardware components of the Information Handling System (IHS), the remote access controller comprising a logic unit and a memory device having instructions stored thereon that, upon execution by the logic unit, cause the remote access controller to: initiate an update of firmware used to operate the first hardware component, wherein the firmware update comprises a firmware image; determine an available bandwidth of a first signaling pathway used by the first hardware component; determine an available bandwidth of a second signaling pathway used by the first hardware component; transmit a first portion of the firmware image to the first hardware component using the first signaling pathway, wherein a size of the first portion of the firmware image is selected based on the available bandwidth of the first signaling pathway; and transmit a second portion of the firmware image to the first hardware component using the second signaling pathway, where a size of the second portion of the firmware image is selected based on the available bandwidth of the second signaling pathway.

In some IHS embodiments, the first signaling pathway comprises a sideband signaling pathway utilized by the remote access controller in managing the first hardware component. In some IHS embodiments, the sideband signaling pathway comprises an I2C bus controlled by the remote access controller. In some IHS embodiments, the second signaling pathway comprises an inband signaling pathway utilized by a CPU (Central Processing Unit) of the IHS in communicating with the first hardware component. In some IHS embodiments, the inband signaling pathway comprises a PCIe switch fabric. In some IHS embodiments, execution of the instructions further causes the remote access controller to: direct the first hardware component to retrieve the first portion of the firmware image via the first signaling pathway; and direct the first hardware component to retrieve the second portion of the firmware image via the second signaling pathway. In some IHS embodiments, execution of the instructions further causes the remote access controller to: designate a first memory region for retrieval of the first portion of the firmware image by first hardware component via the first signaling pathway; and designate a second memory region for retrieval of the first portion of the firmware image by first hardware component via the first signaling pathway. In some IHS embodiments, the first memory region comprise a first region of a secured memory of the remote access controller and the second memory region comprise a second region of a secured memory of the remote access controller. In some IHS embodiments, execution of the instructions further causes the remote access controller to: identify, prior to a completed transmission of the firmware image to the first hardware component, a change in available bandwidth of the first signaling pathway used by the first hardware component; adjust the first portion of the firmware image for transmission to the first hardware component using the first signaling pathway; and adjust the second portion of the firmware image for transmission to the first hardware component using the second signaling pathway. In some IHS embodiments, the change in available bandwidth comprises a reduction in bandwidth availability of the first signaling pathway, and wherein the adjustment of the first portion of the firmware image comprises decreasing a size of the first portion of the firmware image for transmission using the first signaling pathway and the adjustment of the second portion of the firmware image comprises increasing a size of the second portion of the firmware image for transmission using the second signaling pathway. In some IHS embodiments, the identified change in bandwidth availability of the first signaling pathway comprises a failure in a PCIe switch that implements an inband PCIe switch fabric of the IHS. In some IHS embodiments, the identified change in bandwidth availability of the first signaling pathway comprises a failure in an I2C sideband management bus of the remote access controller.

In various additional embodiments, methods are provided for multi-channel transmission of a firmware image to a first hardware component of an IHS, where the firmware image is transmitted by a remote access controller of the IHS supporting remote management of the first hardware component. The methods may include: initiating an update of firmware used to operate the first hardware component; determining an available bandwidth of a first signaling pathway used by the first hardware component; determining an available bandwidth of a second signaling pathway used by the first hardware component; transmitting a first portion of the firmware image to the first hardware component using the first signaling pathway, wherein a size of the first portion of the firmware image is selected based on the available bandwidth of the first signaling pathway; and transmitting a second portion of the firmware image to the first hardware component using the second signaling pathway, where a size of the second portion of the firmware image is selected based on the available bandwidth of the second signaling pathway.

Method embodiments may also include: directing the first hardware component to retrieve the first portion of the firmware image via the first signaling pathway; and directing the first hardware component to retrieve the second portion of the firmware image via the second signaling pathway. Method embodiments may also include: designating a first memory region for retrieval of the first portion of the firmware image by first hardware component via the first signaling pathway; and designating a second memory region for retrieval of the first portion of the firmware image by first hardware component via the first signaling pathway. Method embodiments may also include: identifying, prior to a completed transmission of the firmware image to the first hardware component, a change in available bandwidth of the first signaling pathway used by the first hardware component; adjusting the first portion of the firmware image for transmission to the first hardware component using the first signaling pathway; and adjusting the second portion of the firmware image for transmission to the first hardware component using the second signaling pathway.

In various additional embodiments, remote access controllers supporting remote management of first hardware component of an (IHS), where the remote access controller may include: a logic unit and a memory device having instructions stored thereon that, upon execution by the logic unit, cause the remote access controller to: initiate an update of firmware used to operate the first hardware component, wherein the firmware update comprises a firmware image; determine an available bandwidth of a first signaling pathway used by the first hardware component; determine an available bandwidth of a second signaling pathway used by the first hardware component; transmit a first portion of the firmware image to the first hardware component using the first signaling pathway, wherein a size of the first portion of the firmware image is selected based on the available bandwidth of the first signaling pathway; and transmit a second portion of the firmware image to the first hardware component using the second signaling pathway, where a size of the second portion of the firmware image is selected based on the available bandwidth of the second signaling pathway.

In remote access controller embodiments, the first signaling pathway comprises a sideband signaling pathway utilized by the remote access controller in managing the first hardware component. In remote access controller embodiments, the sideband signaling pathway comprises an I2C bus controlled by the remote access controller. In remote access controller embodiments, the second signaling pathway comprises an inband signaling pathway utilized by a CPU (Central Processing Unit) of the IHS in communicating with the first hardware component.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
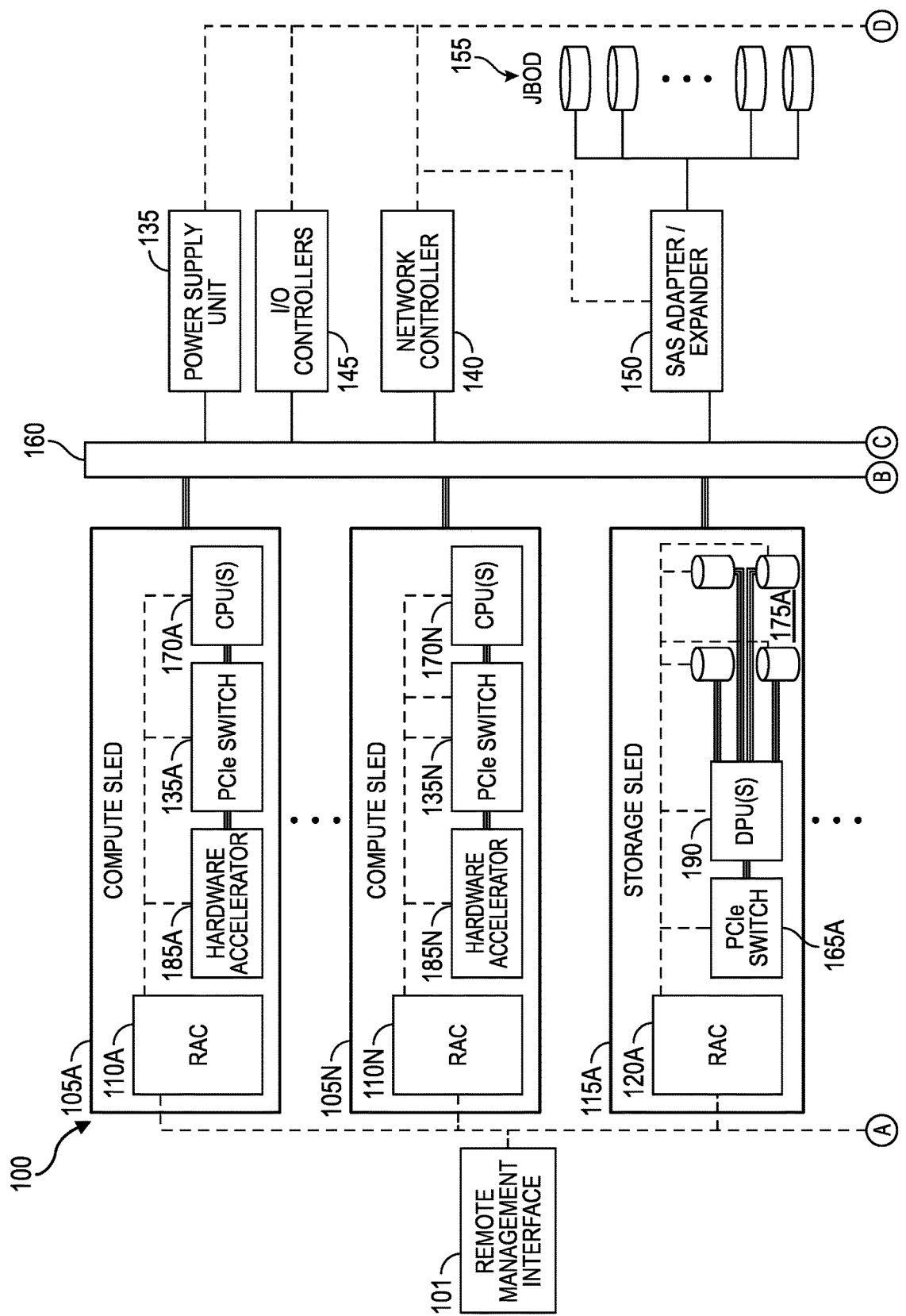
FIG. 1 is a diagram illustrating certain components of a chassis configured, according to some embodiments, for multi-channel updates to firmware used by IHSs installed in the chassis.
Figure 1B:
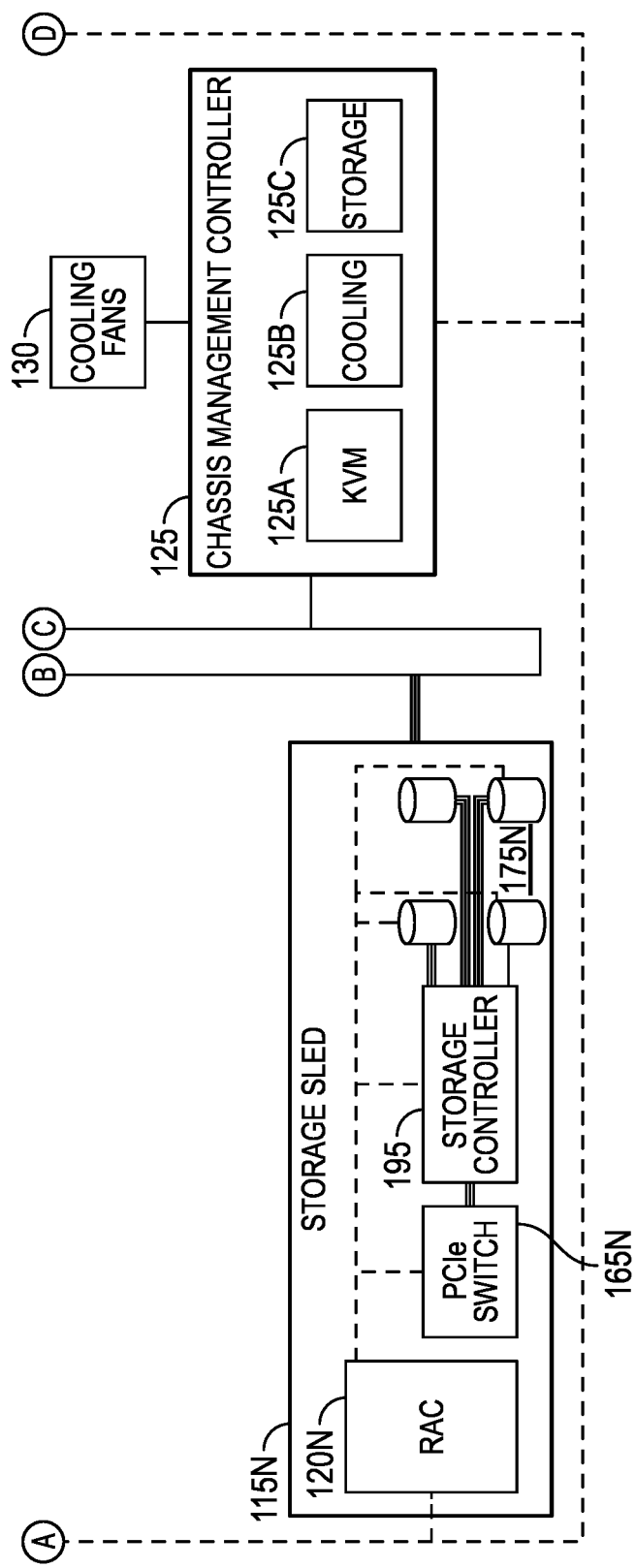

FIG. 1 is a block diagram illustrating certain components of a chassis 100 comprising one or more compute sleds 105a-n and one or more storage sleds 115a-n that may be configured to implement the systems and methods described herein for multi-channel updates to firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
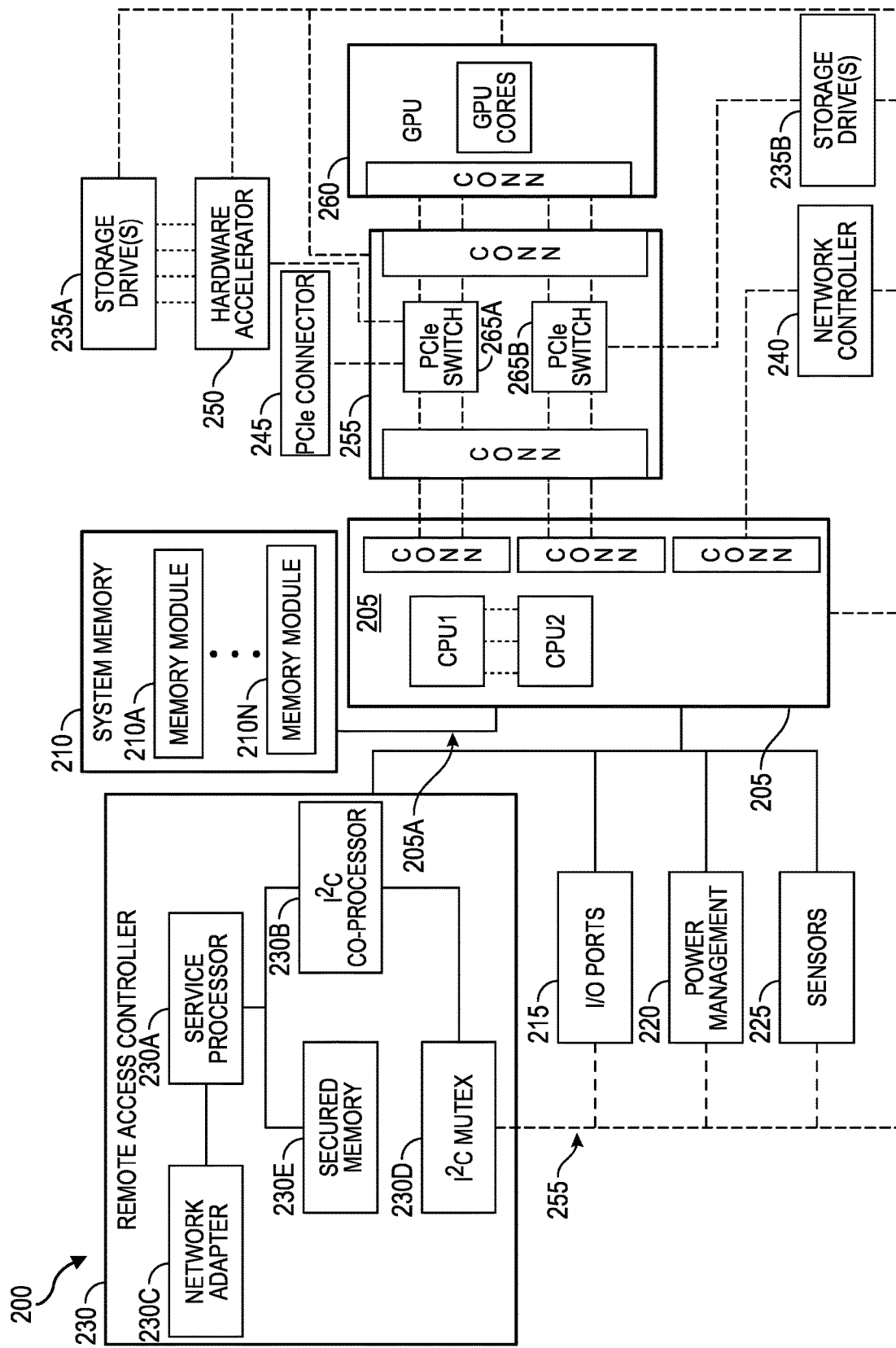
FIG. 2 is a diagram illustrating certain components of an IHS configured, according to some embodiments, for multi-channel updates to firmware used by the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made as quickly as possible, such that the hardware component, and in some cases the entire chassis, are out of service for as little time as possible. Firmware images may be relatively large files that may take several minutes to transmit to the hardware component being updated, regardless of the signaling pathway that is selected for transmitting the file. If the firmware image is transmitted solely over a relatively low bandwidth sideband management bus, a firmware image may take tens of minutes to transmit to a hardware component. During this interval during which the firmware image is being transmitted, numerous types of errors can occur in the IHS, elsewhere within a shared chassis, in the remote access controller, in the hardware component being updated and/or in another hardware component that shares use of the signaling pathway being used to transmit the firmware image. Due to such errors during transmission of the firmware image, the hardware component being updated may be left in an undefined and/or inoperable state that requires manual administration of the device, and in some instances, may render the managed hardware component permanently inoperable. Accordingly, the less time it takes to transmit a firmware image to the hardware component being updated, the less time there is for such error conditions to occur that can remove a chassis and/or hardware components out of service.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 110a-n, 120a-n, without having to reboot the chassis or any of the sleds 110a-n, 120a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, a set of firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for multi-channel updates to firmware used by the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n* or other type of server, such as an 1 RU server installed within a 2 RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205*a*. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245a, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

As described in additional detail below, remote access controller 230 embodiments may support capabilities for utilizing available communication channels to transmit firmware updates to managed hardware components 205, 235a-b, 240, 250, 255, 260 concurrently over multiple of these available channels. By logically dividing a firmware image that includes the update into portions and transmitting the portions concurrently through multiple channels, the firmware image can be transmitted to the managed hardware device more quickly, thus reducing the opportunities for an error to occur during the firmware transfer, and reducing the time required to implement the update. In embodiments, the remote access controller 230 may transmit firmware to managed devices concurrently utilizing both in-band signaling, such as VDMs that are transmitted using MCTP over the PCIe switch fabric that is implemented by PCIe switch 255, and may also utilize sideband signaling, such as PLDM communications transmitted via sideband connections 255 supported by an I2C co-processor 230b of the remote access controller 230. As described in additional detail below, the remote access controller 230 may also include capabilities for load balancing the transmission of firmware updates to managed hardware components 205, 235a-b, 240, 250, 255, 260, where the apportionment of the firmware image to each available communication channel is commensurate with the bandwidth availability for each of the channels.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235*a-b,* 240, 250, 255, 260 of IHS. In some embodiments, the I2C co-processor 230*b* may be an integrated circuit on the same die as the service processor 230*a,* such as a peripheral system-on-chip feature that may be provided by the service processor 230*a*. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235*a-b,* 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
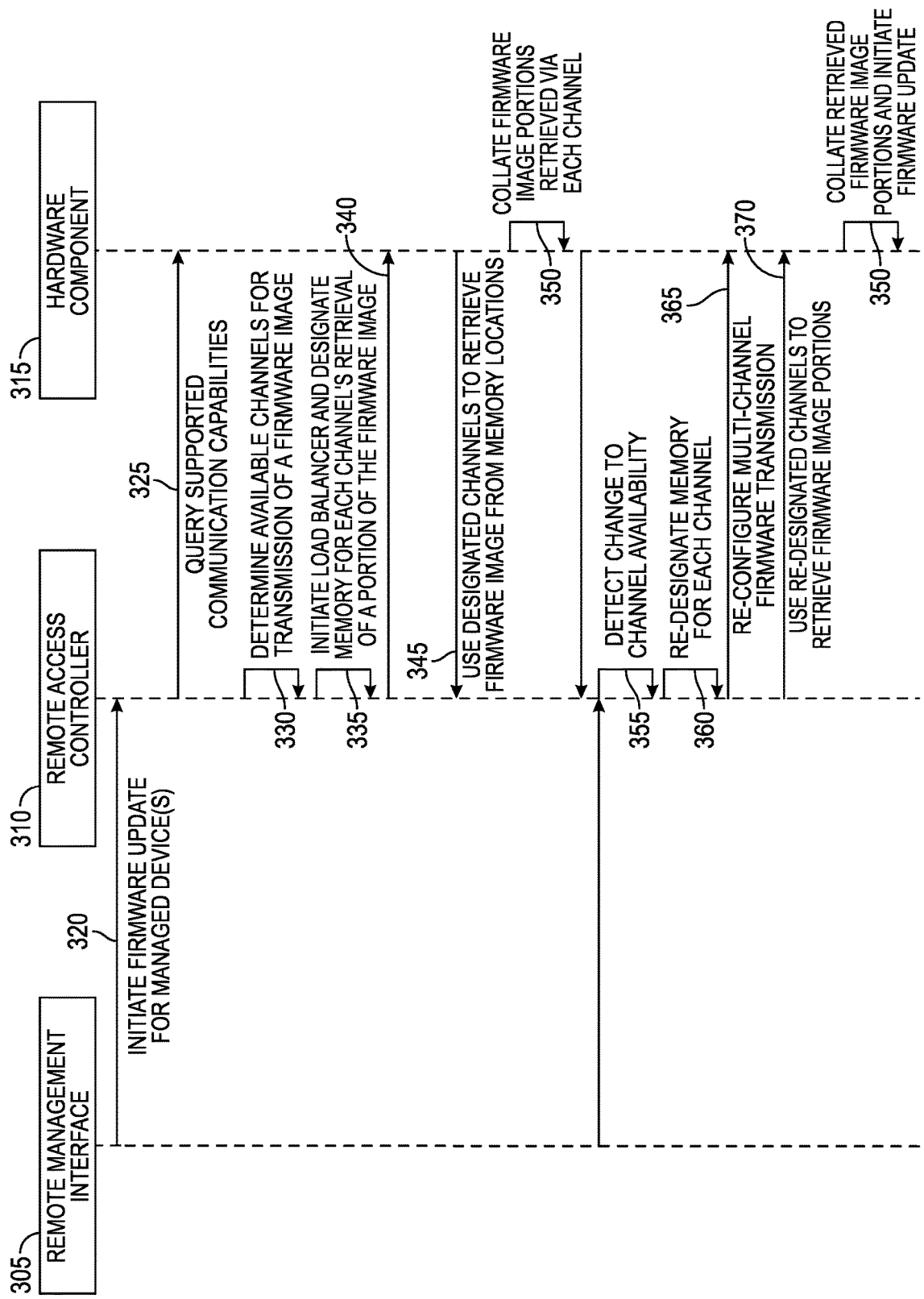
FIG. 3 is a swim lane diagram illustration operations by certain components of a system, according to some embodiments, for multi-channel updates to firmware used by an IHS.

FIG. 3 is a swim lane diagram illustration operations by certain components of a system, according to some embodiments, for multi-channel updates to firmware used by hardware components of an IHS, such as the IHSs described with regard to FIGS. 1 and 2. As described with regard to FIG. 1, datacenter administrators may utilize a remote management interface 101 to initiate a variety of management operations on a chassis, IHSs installed the chassis, and managed components of the respective IHSs. In FIG. 3, the remote management interface 305 is utilized, at 320, to initiate a firmware update for one or more managed hardware components operating within the data center. For instance, the remote management interface 305 may be used to initiate an update to the firmware of all storage drives a particular type, such as all storage drives of a particular model number. In another example, the remote management interface 305 may be used to initiate a discrete update to the firmware of a particular device, such as to update the firmware used to configure the programmable capabilities of a hardware accelerator. As described, the firmware image that includes the updated firmware and that is transmitted to the managed device may be relatively large in size and may take several minutes to transmit to the manage device, especially when using lower-bandwidth sideband communication channels. Accordingly, embodiments support faster transmission of these firmware images to managed devices, thus reducing the risk of an error disrupting the firmware update, and potentially rendering the managed device inoperable.

As indicated in FIG. 3, the remote management interface 305 initiates an update to the firmware of a managed hardware component 315 via commands delivered to a remote access controller 310 of the IHS in which the hardware component 315 is installed. In initiating updates to multiple managed hardware components, such as all storage drives of a particular model number operating within the data center, the remote management interface 305 may direct commands to the remote access controllers 310 of each IHS that includes one of the managed components to be updated. In response to the command from the remote management interface 305, the remote access controller 310 initiates procedures for determining the available communication channels that may be used to transmit a firmware image to the hardware component 315.

Accordingly, at 325, the remote access controller 310 queries the managed hardware component 315 for its supported communication capabilities. For instance, in response to queries, the managed hardware component 315 may respond with a listing of the sideband communication channels that are supported, the bandwidth capacity for each of the supported communication channels, and message size restrictions for each of the supported communication channels. As described, a managed hardware component 315 may be coupled to the remote access controller 310 via a sideband I2C signaling pathway that is controlled and exclusively utilized by the remote access controller 310. In addition, a managed hardware component 315 may also support other sideband communication channels that are external and separate from the operating system of an IHS. For instance, the hardware component 315 may be coupled to a TPM via a sideband communication channel, where this TPM sideband communication channel may be accessed indirectly by the remote access controller 310 as a component operating within the root of trust of the IHS. In another example, the hardware component 315 may be coupled to another managed component via a sideband communication channel. For instance, in the IHS of FIG. 2, a storage drive 235*a* may be connected to a hardware accelerator 250 via both inband and sideband communication channels. The storage drive 235*a* and the hardware accelerator 250 may utilize in band PCIe communications for I/O transmissions and may utilize sideband communications for configuring the storage drive 235*a*.

Similarly, the managed hardware component 315 may support multiple inband signaling pathways. As described, a managed hardware component 315 may support inband communications through a PCIe link that couples the hardware component 315 to the PCIe switch fabric, thus allowing the hardware component to communicate with other devices that are also coupled to the PCIe switch fabric. In some instances, the remote access controller 310 may thus be capable of PCIe communications with the hardware component 315 over the PCIe switch fabric. However, in other instances, a managed hardware component 315 may support PCIe communications, but may be restricted to only PCIe communications with a particular device. For instance, in the IHS of FIG. 2, a storage drive 235*a* may be connected to a hardware accelerator 250 via an inband PCIe communication channel that supports high-bandwidth communications between the storage drive and hardware accelerator, but this high-bandwidth PCIe link may thus be inaccessible to the remote access controller 310. In some instances, a hardware component 315 may alternatively or additionally include other inband signaling pathway capabilities, such as communications that are supported by the operating system of the IHS. Accordingly, in response to the query by the remote access controller 310, at 325, the hardware component 315 provides a listing of the available inband and sideband communication channels supported by a hardware component 315, and the capabilities and/or restrictions on each of the available communication channels.

Based on the communication channel capabilities provided by the hardware component 315, at 330, the remote access controller 310 determines the channels that will be utilized for transmission of the firmware image to the hardware component. In some embodiments, the remote access controller 310 may select all available communication channels for transmission of the firmware image to the hardware component 315. However, in other embodiments, the remote access controller 310 may only select available communication channels that can support a requisite amount of bandwidth. In some embodiments, the number of available communication channels selected by the remote access controller 310 may be commensurate with the size of the firmware image to be transmitted. For example, a firmware image greater than 25 MB in size may result in the remote access controller 310 utilizing all available communication channels supported by the hardware component 315, while a firmware image smaller than 25 MB may result in the remote access controller utilizing only the two available communication channels with the largest available bandwidth.

Upon determining the communication channels that will be used for transmission of the firmware image, at 335, the remote access controller designates portions of the firmware image that will be transmitted to the hardware component using each of the selected communication channels. As described, the remote management interface 305 initiates the updated firmware of hardware component 315. As part of this update, the remote management interface 305 may transmit, or otherwise made available, the firmware image that includes the updated firmware to the remote access controller 310. The remote access controller 310 subsequently stores the firmware image to a local memory, such as the secure memory 230e of the remote access controller 230 of FIG. 2. Once the communication channels for transmission of the firmware image have been selected, the remote access controller 310 logically divides the stored firmware image into distinct portions, where each portion of the firmware image designated for transmission to the hardware component 315 by one of the selected communication channels.

For example, in a scenario where two sideband and one inband communication channel have been selected for transmitting the firmware image to the hardware component 315, the firmware image is logically divided into three distinct portions, where one portion is designated for transmission via one sideband channel, a second portion is designated for transmission via another sideband channel, and the third portion is designated for transmission via the in band channel. As indicated in FIG. 3, the remote access controller 310 initiates a load balancer when designating portions of the firmware image for transmission on each of the selected channels. The load balancer evaluates the queried communication capabilities of each of the channels in order to determine the share of the firmware image to be transmitted by each channel. The relatives sizes of each portion of the firmware image may be commensurate with the bandwidth capabilities of each of the selected communication channels. For instance, a high-bandwidth inband PCIe link may be used to transmit 75 percent of a firmware image to the hardware component 315, and a lower bandwidth sideband bus may be used to transmit 15 percent of a firmware image, and another sideband bus with a still lower bandwidth may be used to transmit the remaining 10 percent of the firmware image. Upon the load balancer making such determinations regarding the share of the firmware image to be transmitted using each of the available communication channels, the remote access controller 310 may designate a corresponding range of memory locations in which each of the portions of the firmware image are stored for retrieval using each of the selected communication channel.

At 340, the remote access controller 310 provides the communication channel designations to the hardware component 315. In some embodiments, the remote access controller 310 may notify the hardware component 315 of a firmware update and may specify the memory locations at which different portions of a firmware image can be retrieved using each of the supported communication channels that have been selected by the remote access controller 310. Using this configuration information, at 345, the hardware component 315 initiates retrieval of the firmware image from the remote access controller 310. In particular, the hardware component 315 uses one communication channel for retrieving a first portion of the firmware image from the remote access controller 310 and uses a second communication channel for retrieving a second portion of the firmware from the remote access controller 310. In this manner, the hardware component 315 may retrieve any number of firmware portions using any number of available communication channels that have been selected for use by the remote access controller 310.

In some embodiments, the hardware component 315 is provided with information about the different communication channels to be used in retrieving the portions of the firmware image, such as from designated memory locations of the remote access controller 310. For instance, the hardware component 315 may utilize one sideband communication channel, such as using PLDM communications transmitted via the I2C management bus of the remote access controller 310, for retrieving a portion of the firmware image from a first range of memory locations specified by remote access controller 310, where this memory range may be within a secured memory of the remote access controller. In this scenario, the hardware component 315 may also utilize a second sideband communication channel, such as using PLDM communications transmitted via an I2C bus operated by a TPM of the IHS, for retrieving another portion of the firmware image from a second range of memory locations.

As indicated in FIG. 3, at 350, as the firmware image is retrieved from a remote access controller 310, the retrieved information is collated by the hardware component 315 in order to reconstruct the firmware image in a local memory of the hardware component 315. In some instances, the complete firmware image may be retrieved by the hardware component 315 in this manner with no adjustments to the portions of the firmware image that are retrieved using each of the selected communication channels. In such instances, the transmission of the firmware image is completed in less time than is otherwise possible using any of the individual communication channels that are available to the hardware component 315. Accordingly, the time required to transmit the firmware image is reduced and the possibility of errors occurring during this interval is thus also reduced.

However, in some scenarios, operating conditions within an IHS may change during the interval during which the portions of the firmware image are being retrieved by the hardware component 315. Accordingly, embodiments may implement various monitors for detecting changes in operating conditions that result in changes in the bandwidth availability of the communication channels being used to retrieve the firmware image. As indicated in FIG. 3, such indications of changes to bandwidth availability in these communication channels may be provided by the remote management interface 305, the remote access controller 310, and/or the hardware component 315.

In some instances, the hardware component 315 may report a failure in a communication channel. For example, the hardware component 315 may report a reduction in available PCIe bandwidth for inband communications, such resulting from PCIe lane reconfigurations by a PCIe switch of the IHS. The hardware component 315 may likewise report a failure in a communication channel, such as resulting from an unexpected rebooting of the PCIe interface of the hardware component. In some instances, a change in bandwidth availability may be reported by remote management interface 305. For example, in configurations where a PCIe switch of an IHS has been bridged with a PCIe switch in another IHS within the same chassis, the remote management interface may signal a reinitialization of the bridged PCIe switch fabric, thus requiring restarting both PCIe switches and resulting in termination of the PCIe link utilized by the hardware component 315. In some instances, a change in bandwidth availability may be detected directly by remote access controller 310. For instance, the remote access controller 310 may detect a failure in an I2C coprocessor or I2C mutex, such as in the remote access controller 230 of FIG. 2, resulting in the I2C sideband management bus of the remote access controller become temporarily unavailable. In another example, the remote access controller 310 may detect a reduction in available bandwidth in an I2C sideband management bus due to initiation of emergency security operations that utilize this sideband bus.

In some embodiments, changes in channel availability, including changes in available bandwidth, may be determined through the use of management commands supported by the remote access controller 310 and the hardware component 315, such as customized PLDM management commands that may be communicated on a sideband I2C management bus. For instance, these customized management commands may support queries by the remote access controller 310 to the hardware component 315 for bandwidth availability on one or more communication channels, thus allowing the remote access controller to use a single command to determine the bandwidth availability on all communication channels supported by the hardware component. In addition, the hardware component 315 may utilize the customized PLDM commands to notify the remote access controller 310 of changes in bandwidth availability, such as due to re-allocation of some or all of the lanes of a PCIe link. Based on such changes reported through these PLDM commands, the load balancer operating on the remote access controller may reallocate transmission of the firmware image.

As indicated in FIG. 3, upon detecting a change in channel availability, at 360, the remote access controller 310 re-designates the memory for use by each of the communication channels being used to retrieve the firmware image by the hardware component 315. For example, in response to a 50 percent reduction in available bandwidth of a communication channel being used by the hardware component 315 to retrieve a first portion of the firmware image from a first region of memory, the load balancer of the remote access controller 310 may re-designate one half of the firmware image in this first memory region for retrieval using a second communication channel that is functioning properly. In some embodiments, in response to a communication channel becoming inoperable or subject to reduced bandwidth availability, the load balancer may utilize available communication channels that are supported by the hardware component 315, but that were not initially selected for use in the transmission of firmware image. In other embodiments, the remote access controller 310 may instead re-apportion the firmware image among the communication channels that are already in use in the transmission of the firmware image.

At 365, the remote access controller 310 issues management commands to the hardware component 315 with updates to the portions of the firmware image to be retrieved using each communication channel. In some embodiments, the updated configuration for retrieval of the firmware image may specify updated regions of memory from which the remaining portions of the firmware image may be retrieved using each communication channel. As before, at 370, the hardware component 315 utilizes the provided information to retrieve portions of the firmware image from the remote access controller 310. In some embodiments, the hardware component 315 may retrieve portions of the firmware image from specific memory regions that have designated for retrieval of a portion of the firmware image using each of the selected communication channels. In this manner, the load balancer of the remote access controller 310 may continue adjusting portions of the firmware that are retrieved using the different communication channels that are available to the hardware component 315. In some embodiments, the different memory regions defined by the remote access controller 310 may include annotations that are useable by the hardware component 315 in collating the portions of the firmware image retrieved from the different memory regions.

Once the entire firmware image has been retrieved, at 375, the hardware component collates the retrieved portions in order to reconstruct the entire firmware image in a local memory of the hardware component. Upon reconstruction of the entire firmware image, the hardware component 315 may then initiate the firmware update. In this manner, embodiments support rapid transmittal of a firmware image to a hardware component, thus reducing the chance of errors during the interval in which the firmware update remains in progress. In addition, embodiments provide fault tolerance in a manner that compensates for errors or reduced availability of communication channels being used for transmission of firmware images.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
one or more Central Processing Units (CPUs) utilizing one or more buses that connect to a plurality of hardware components;
a first hardware component of the plurality of hardware components of the IHS; and
a remote access controller supporting remote management of the plurality of hardware components of the IHS, the remote access controller comprising a logic unit and a memory device having instructions stored thereon that, upon execution by the logic unit, cause the remote access controller to:
  initiate a firmware update used to operate the first hardware component, wherein the firmware update comprises a firmware image;
  determine an available bandwidth of a first signaling pathway used by the first hardware component, wherein the first signaling pathway comprises a sideband signaling pathway utilized by the remote access controller in managing the first hardware component and further comprises an Inter-Integrated Circuit (I2C) bus controlled by the remote access controller;
  determine an available bandwidth of a second signaling pathway used by the first hardware component;
  transmit a first portion of the firmware image to the first hardware component using the first signaling pathway, wherein a size of the first portion of the firmware image is commensurate with the available bandwidth of the first signaling pathway;
  transmit a second portion of the firmware image to the first hardware component using the second signaling pathway, where a size of the second portion of the firmware image is commensurate with the available bandwidth of the second signaling pathway;
  identify, prior to a completed transmission of the firmware image to the first hardware component, a change in available bandwidth of the first signaling pathway used by the first hardware component;
  adjust the first portion of the firmware image for transmission to the first hardware component using the first signaling pathway; and
  adjust the second portion of the firmware image for transmission to the first hardware component using the second signaling pathway, wherein once the adjusted first portion and the adjusted second portion of the firmware image are received by the first hardware component, the first portion, the second portion, the adjusted first portion and the adjusted second portion are collated to reconstruct the firmware image in a local memory of the first hardware component.

2. The IHS of claim 1, wherein the second signaling pathway comprises an inband signaling pathway utilized by a CPU of the IHS in communicating with the first hardware component.

3. The IHS of claim 2, wherein the inband signaling pathway comprises a Peripheral Component Interconnect Express (PCIe) switch fabric.

4. The IHS of claim 1, wherein execution of the instructions further causes the remote access controller to:
direct the first hardware component to retrieve the first portion of the firmware image via the first signaling pathway; and
direct the first hardware component to retrieve the second portion of the firmware image via the second signaling pathway.

5. The IHS of claim 4, wherein execution of the instructions further causes the remote access controller to:
designate a first memory region for retrieval of the first portion of the firmware image by the first hardware component via the first signaling pathway; and
designate a second memory region for retrieval of the first portion of the firmware image by the first hardware component via the first signaling pathway.

6. The IHS of claim 5, wherein the first memory region comprise a first region of a secured memory of the remote access controller and the second memory region comprise a second region of a secured memory of the remote access controller.

7. The IHS of claim 1, wherein the change in available bandwidth comprises a reduction in bandwidth availability of the first signaling pathway, and wherein the adjustment of the first portion of the firmware image comprises decreasing a size of the first portion of the firmware image for transmission using the first signaling pathway and the adjustment of the second portion of the firmware image comprises increasing a size of the second portion of the firmware image for transmission using the second signaling pathway.

8. The IHS of claim 1, wherein the identified change in bandwidth availability of the first signaling pathway comprises a failure in a Peripheral Component Interconnect Express (PCIe) switch that implements an inband PCIe switch fabric of the IHS.

9. The IHS of claim 1, wherein the identified change in bandwidth availability of the first signaling pathway comprises a failure in an Inter-Integrated Circuit (I2C) sideband management bus of the remote access controller.

10. A method for multi-channel transmission of a firmware image to a first hardware component of an Information Handling System (IHS), wherein the firmware image is transmitted by a remote access controller of the IHS supporting remote management of the first hardware component, the method comprising:
initiating a firmware update used to operate the first hardware component, wherein the firmware update comprises the firmware image;
determining an available bandwidth of a first signaling pathway used by the first hardware component, wherein the first signaling pathway comprises a sideband signaling pathway utilized by the remote access controller in managing the first hardware component and further comprises an Inter-Integrated Circuit (I2C) bus controlled by the remote access controller;
determining an available bandwidth of a second signaling pathway used by the first hardware component;
transmitting a first portion of the firmware image to the first hardware component using the first signaling pathway, wherein a size of the first portion of the firmware image is commensurate with the available bandwidth of the first signaling pathway;
transmitting a second portion of the firmware image to the first hardware component using the second signaling pathway, where a size of the second portion of the firmware image is commensurate with the available bandwidth of the second signaling pathway;
identifying, prior to a completed transmission of the firmware image to the first hardware component, a change in available bandwidth of the first signaling pathway used by the first hardware component;

adjusting the first portion of the firmware image for transmission to the first hardware component using the first signaling pathway;

adjusting the second portion of the firmware image for transmission to the first hardware component using the second signaling pathway;

once the adjusted first portion and the adjusted second portion of the firmware image are received by the first hardware component, collating the first portion, the second portion, the adjusted first portion and the adjusted second portion to reconstruct the firmware image in a local memory of the first hardware component.

11. The method of claim 10, further comprising:

directing the first hardware component to retrieve the first portion of the firmware image via the first signaling pathway; and directing the first hardware component to retrieve the second portion of the firmware image via the second signaling pathway.

12. The method of claim 11, further comprising:

designating a first memory region for retrieval of the first portion of the firmware image by first hardware component via the first signaling pathway; and designating a second memory region for retrieval of the first portion of the firmware image by first hardware component via the first signaling pathway.

13. A remote access controller supporting remote management of first hardware component of an Information Handling System (IHS), the remote access controller comprising:

a logic unit and a memory device having instructions stored thereon that, upon execution by the logic unit, cause the remote access controller to:

initiate a firmware update used to operate the first hardware component, wherein the firmware update comprises a firmware image;

determine an available bandwidth of a first signaling pathway used by the first hardware component, wherein the first signaling pathway comprises a sideband signaling pathway utilized by the remote access controller in managing the first hardware component and further comprises an Inter-Integrated Circuit (I2C) bus controlled by the remote access controller;

determine an available bandwidth of a second signaling pathway used by the first hardware component;

transmit a first portion of the firmware image to the first hardware component using the first signaling pathway, wherein a size of the first portion of the firmware image is commensurate with the available bandwidth of the first signaling pathway;

transmit a second portion of the firmware image to the first hardware component using the second signaling pathway, where a size of the second portion of the firmware image is commensurate with the available bandwidth of the second signaling pathway;

identify, prior to a completed transmission of the firmware image to the first hardware component, a change in available bandwidth of the first signaling pathway used by the first hardware component;

adjust the first portion of the firmware image for transmission to the first hardware component using the first signaling pathway; and adjust the second portion of the firmware image for transmission to the first hardware component using the second signaling pathway, wherein once the adjusted first portion and the adjusted second portion of the firmware image are received by the first hardware component, the first portion, the second portion, the adjusted first portion and the adjusted second portion are collated to reconstruct the firmware image in a local memory of the first hardware component.

14. The remote access controller of claim 13, wherein the second signaling pathway comprises an inband signaling pathway utilized by a Central Processing Unit (CPU) of the IHS in communicating with the first hardware component.

* * * * *